United States Patent
Eckel et al.

(12)

(10) Patent No.: US 6,326,423 B1
(45) Date of Patent: Dec. 4, 2001

(54) POLYCARBONATE-ABS MOULDING COMPOUNDS

(75) Inventors: Thomas Eckel, Dormagen; Michael Zobel, Düsseldorf; Dieter Wittmann, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/582,940

(22) PCT Filed: Jan. 5, 1999

(86) PCT No.: PCT/EP99/00025

§ 371 Date: Jul. 7, 2000

§ 102(e) Date: Jul. 7, 2000

(87) PCT Pub. No.: WO99/36468

PCT Pub. Date: Jul. 22, 1999

(30) Foreign Application Priority Data

Jan. 14, 1998 (DE) ............................................... 198 01 050

(51) Int. Cl.$^7$ .................................................. C08K 5/523
(52) U.S. Cl. ........................ 524/117; 524/119; 524/141; 524/145
(58) Field of Search .................................... 524/117, 119, 524/141, 145, 912

(56) References Cited

U.S. PATENT DOCUMENTS

Re. 32,473 * 8/1987 Mott .
3,786,114 * 1/1974 Jaquiss et al. .
3,807,977 * 4/1974 Johnston et al. .
3,953,539 * 4/1976 Kawase et al. .
4,244,848 * 1/1981 Minagawa et al. .
4,450,249 * 5/1984 Schmidt et al. .
4,618,633 * 10/1986 Taubitz et al. .
4,647,168 * 3/1987 Kress et al. .
4,766,165 * 8/1988 Kress et al. .
4,820,772 * 4/1989 Goto et al. .
5,013,776 * 5/1991 Ishihata et al. .
5,122,556 * 6/1992 Kambour .
5,151,455 * 9/1992 Miyata et al. .
5,227,366 * 7/1993 Swatling et al. .
5,234,980 * 8/1993 Ohira .
5,672,645 * 9/1997 Eckel et al. .

FOREIGN PATENT DOCUMENTS

2414849 * 10/1974 (DE) .
446358 * 9/1991 (EP) .
522432 * 1/1993 (EP) .
45-16826 1/1979 (JP) .
54-91553 7/1979 (JP) .
58-27734 2/1983 (JP) .
64-79244 3/1989 (JP) .

* cited by examiner

Primary Examiner—Veronica P. Hoke
(74) Attorney, Agent, or Firm—Joseph C. Gil; Aron Preis

(57) ABSTRACT

The present invention relates to polycarbonate-ABS molding compositions containing phosphorus compounds which are group IB, IIB or VIII metal salts of partial phosphoric acid esters which have excellent mechanical properties, in particular excellent notched impact strength, stress cracking behavior and heat resistance.

16 Claims, No Drawings

POLYCARBONATE-ABS MOULDING COMPOUNDS

The present invention relates to polycarbonate-ABS moulding compositions containing phosphorus compounds which have excellent mechanical properties, in particular excellent notched impact strength, stress cracking behavior and heat resistance.

Metal salts of organic monophosphates or diphosphoric acids are well known. They have been used hitherto as heat and UV stabilisers in halogen-containing moulding compositions such as PVC (JP 010 792 44, JP 540 915 53, JP 580 277 34) or in polyamides (JP 450 168 26B4).

Polycarbonate-ABS blends are a well known class of substances for applications in the automotive sector and in the electrical engineering/electronics sector. The favourable combination of properties of good heat resistance and good mechanical values, for example, in terms of the notched impact strength or stress cracking behavior, has always proved to be advantageous. If, nevertheless, the notched impact strength or the stress cracking resistance should be insufficient for certain parts, the conventional procedure is to increase the rubber content. This measure is, however, always associated with a marked reduction in the heat resistance.

It has now been found that this problem may be solved using the phosphorus compounds according to the invention.

The present invention provides thermoplastic moulding compositions containing

A 5 to 95, preferably 10 to 90, particularly preferably 20 to 85 parts by wt., particularly 50 to 85 parts by wt. of polycarbonate and/or polyester carbonate, B 0 to 50, preferably 1 to 30, particularly preferably 2 to 25 parts by wt. of a vinyl (co)polymer of one or at least two ethylenically unsaturated monomers, C 0.5 to 60, preferably 1 to 40, particularly preferably 2 to 30 parts by wt. of graft polymer with a glass transition temperature of <10° C., obtainable by graft polymerisation of at least 2 of the monomers selected from chloroprene, butadiene, isoprene, styrene, acrylonitrile, ethylene, propylene, vinyl acetate and (meth)acrylate with 1 to 18 carbon atoms in the alcohol component, and D 0.5 to 20 parts by wt., preferably 1 to 18 parts by wt., particularly preferably 2 to 15 parts by wt. of phosphorus compound corresponding to formula (Ia) and/or (Ib)

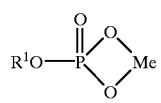

(Ia)

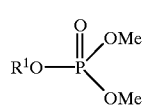

(Ib)

or to the formula (II)

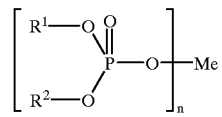

(II)

wherein

R$^1$ and R$^2$ independently of one another, mean optionally halogenated C$_1$–C$_{24}$-alkyl, C$_5$–C$_6$-cycloalkyl, C$_6$–C$_{20}$-aryl or C$_7$–C$_{12}$-aralkyl in each case optionally substituted by halogen and/or C$_1$–C$_{10}$ alkyl, or R$^1$ and R$^2$ in the case of formula (II) may also form an alkylene radical, preferably with up to 6, particularly 2 or 3 carbon atoms, or an arylene radical, preferably phenylene, Me stands for a metal selected from the 1st to 3rd main group or from the subsidiary group VIII, IB and 2B of the periodic system, and n is determined by the valency of the metal ion.

Component A

Aromatic polycarbonates and/or aromatic polyester carbonates according to component A suitable according to the invention are known in the literature or may be prepared according to processes known in the literature (for the preparation of aromatic polycarbonates, see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; for the preparation of aromatic polyester carbonates, see e.g. DE-OS 3 077 934).

Aromatic polycarbonates are prepared e.g. by reaction of diphenols with carbonic acid halides, preferably phosgene and/or with aromatic dicarboxylic acid dihalides, preferably benzene dicarboxylic acid dihalides, according to the phase boundary process, optionally with the use of chain terminators, for example, monophenols and optionally with the use of trifunctional or more than trifunctional branching agents, for example, triphenols or tetraphenols.

Diphenols for the preparation of aromatic polycarbonates and/or aromatic polyester carbonates are preferably those corresponding to formula (II)

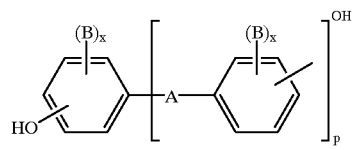

(II)

wherein

A means a simple compound, C$_1$–C$_5$-alkylene, C$_2$–C$_5$-alkylidene, C$_5$–C$_6$-cycloalkylidene, —O—, —SO—, —CO—, —S—, —SO$_2$—, C$_6$–C$_{12}$-arylene, on which further aromatic rings optionally containing heteroatoms may be condensed, or a radical corresponding to formula (III) or (IV)

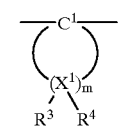

(III)

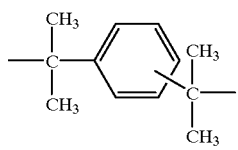

(IV)

B in each case means $C_1$–$C_{12}$-alkyl, preferably methyl, halogen, preferably chlorine and/or bromine, x in each case, independently of one another, is 0, 1 or 2, p is 1 or 0, and $R^3$ and $R^4$ which may be chosen individually for each $X^1$, independently of one another, mean hydrogen or $C_1$–$C_6$-alkyl, preferably hydrogen, methyl or ethyl, $X^1$ is carbon and m is an integer from 4 to 7, preferably 4 or 5, provided that on at least one atom $X^1$, $R^3$ and $R^4$ are simultaneously alkyl.

Preferred diphenols are hydroquinone, resorcinol, dihydroxydiphenols, bis-(hydroxyphenyl) -$C_1$–$C_5$-alkanes, bis-(hydroxyphenyl)-$C_5$–$C_6$-cycloalkanes, bis-(hydroxyphenyl) ethers, bis-(hydroxyphenyl)sulfoxides, bis-(hydroxyphenyl)ketones, bis-(hydroxyphenyl)sulfones and α, α-bis-(hydroxyphenyl)diisopropylbenzenes and the derivatives thereof brominated and/or chlorinated on the nucleus.

Particularly preferred diphenols are 4,4'-dihydroxydiphenyl, bisphenol A, 2,4-bis-(4-hydroxyphenyl)-2-methylbutane, 1,1 -bis-(4-hydroxyphenyl)cyclohexane, 1,1-bis-(4-hydroxyphenyl)-3,3,5-trimethylcyclohexane, 4,4'-dihydroxydiphenylsulfide, 4,4'-dihyroxydiphenylsulfone and the di- and tetrabrominated or chlorinated derivatives thereof such as, for example, 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane.

2,2-bis-(4-hydroxyphenyl)propane (bisphenol A) is particularly preferred.

The diphenols may be used on their own or as any mixtures.

The diphenols are known in the literature or are obtainable according to processes known in the literature.

Chain terminators suitable for the preparation of thermoplastic, aromatic polycarbonates are, for example, phenol, p-chlorophenol, p-tert.-butylphenol or 2,4,6-tribromophenol, and also long-chain alkyl phenols such as 4-(1,3-tetramethylbutyl)phenol according to DE-OS 22 842 005 or monoalkylphenol or dialkyl phenols with a total of 8 to 20 carbon atoms in the alkyl substituents, such as 3,5-di-tert.-butylphenol, p-iso-octylphenol, p-tert.-octylphenol, p-dodecylphenol and 2-(3,5-dimethylheptyl)phenol and 4-(3,5-dimethylheptyl)phenol. The amount of chain terminators to be used is generally between 0.5 mole-% and 10 mole-%, based on the mole sum of the diphenols used in each case.

The thermoplastic, aromatic polycarbonates have average weight-average molecular weights ($M_w$, measured, e.g. by ultracentrifuging or scattered light measurement) from 10,000 to 200,000, preferably 20,000 to 80,000.

The thermoplastic, aromatic polycarbonates may be branched in a known way and preferably by the incorporation of 0.05 to 2.0 mole-%, based on the sum of the diphenols used, of trifunctional or more than trifunctional compounds, for example, those with three and more phenolic groups.

Both homopolycarbonates and copolycarbonates are suitable. For the preparation of copolycarbonates according to the invention according to component A, 1 to 25 wt. %, preferably 2.5 to 25 wt. % (based on the total amount of diphenols to be used) of polydiorganosiloxanes with hydroxyl aryloxy end groups may also be used. These are well known (see, for example, U.S. Pat. No. 3,419,634) and may be prepared according to processes known in the literature. The preparation of copolycarbonates containing polydiorganosiloxanes is described, e.g., in DE-OS 3 334 782.

Preferred polycarbonates, apart from bisphenol A homopolycarbonates, are the copolycarbonates of bisphenol A with up to 15 mole-%, based on the mole sums of diphenols, of other diphenols mentioned in preference or particular preference, particularly 2,2-bis-(3,5-dibromo-4-hydroxyphenyl)propane.

Aromatic dicarboxylic acid dihalides for the preparation of aromatic polyester carbonates are preferably the diacid dichlorides of isophthalic acid, terephthalic acid, diphenylether-4,4'-dicarboxylic acid and of naphthalene-2,6-dicarboxylic acid.

Mixtures of diacid dichlorides of isophthalic acid and of terephthalic acid in a ratio between 1:20 and 20:1 are particularly preferred.

In addition, a carbonic acid halide, preferably phosgene, is also used as bifunctional acid derivative in the preparation of polyester carbonates.

Suitable chain terminators for the preparation of the aromatic polyester carbonates, apart from the monophenols already mentioned, are the chlorocarbonates thereof and also the acid chlorides of aromatic monocarboxylic acids which may optionally be substituted by $C_1$–$C_{22}$ alkyl groups or by halogen atoms, and also aliphatic $C_2$–$C_{22}$ monocarboxylic acid chlorides.

The amount of chain terminators is 0.1 to 10 mole-% in each case, based on moles of diphenols in the case of phenolic chain terminators, and on moles of dicarboxylic acid dichlorides in the case of monocarboxylic acid chloride chain terminators.

The aromatic polyester carbonates may also contain incorporated aromatic hydroxycarboxylic acids.

The aromatic polyester carbonates may be both linear and branched in a known way (see also DE-OS 2 940 024 and DE-OS 3 007 934 in this connection).

Branching agents which may be used include, for example, tri- or more than trifunctional carboxylic acid chlorides such as trimesic acid trichloride, cyanuric acid trichloride, 3,3'-4,4'-benzophenone tetracarboxylic acid tetrachloride, 1,4,5,8-naphthalene tetracarboxylic acid tetrachloride or pyromellitic acid tetrachloride, in quantities from 0.01 to 1.0 mole-% (based on dicarboxylic acid dichlorides used) or tri- or more than trifunctional phenols, such as phloroglucinol, 4,6-dimethyl-2,4,6-tri-(4-hydroxyphenyl) heptene-2,4,4-dimethyl-2,4,6-tri-(4-hydroxyphenyl) heptane, 1,3,5-tri-(4-hydroxyphenyl)benzene, 1,1,1-tri-(4-hydroxyphenyl)ethane, tri-(4-hydroxyphenyl)

phenylmethane, 2,2-bis[4,4-bis(4-hydroxyphenyl) cyclohexyl]propane, 2,4-bis(4-hydroxyphenylisopropyl) phenol, tetra-(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra-4-[4-hydroxyphenylisopropyl]phenoxy)methane, 1,4-bis[4,4'-dihydroxytriphenyl)methyl]benzene, in quantities from 0.01 to 1.0 mole-%, based on diphenols used. Phenolic branching agents may be charged with the diphenols; acid chloride branching agents may be introduced together with the acid dichlorides.

The proportion of carbonate structural units may be varied at will in the thermoplastic aromatic polyester carbonates. The proportion of carbonate groups is preferably up to 100 mole-%, particularly up to 80 mole-%, particularly preferably up to 50 mole-%, based on the sum of ester groups and carbonate groups. Both the ester and carbonate proportion of the aromatic polyester carbonates may be present in the form of blocks or randomly distributed in the polycondensate.

The relative solution viscosity ($\eta_{rel}$) of the aromatic polycarbonates and polyester carbonates is from 1.18 to 1.4, preferably 1.22 to 1.3 (measured on solutions of 0.5 g of polycarbonate or polyester carbonate in 100 ml of methylene chloride solution at 250° C.).

The thermoplastic aromatic polycarbonates and polyester carbonates may be used on their own or in any mixtures.

Component B

The thermoplastic polymer B, which is optionally present in the moulding compositions according to the invention, includes (co)polymers of one or at least two ethylenically unsaturated monomers (vinyl monomers) such as, for example, styrene, α-methylstyrene, styrenes substituted on the nucleus, (e.g. substituted on the nucleus with halogen and/or alkyl), acrylonitrile, methacrylonitrile, methylmethacrylate, maleic anhydride, N-substituted maleinimides and (meth)acrylates with 1 to 18 carbon atoms in the alcohol component.

The (co)polymers according to component B are resin-like, thermoplastic and rubber-free. The moulding composition may also contain various (co)polymers B. In particular preference, 2 to 25 parts by wt. are added.

Preferred vinyl (co) polymers B are those of at least one monomer from the series comprising styrene, α-methylstyrene and/or styrene substituted on the nucleus and/or methylmethacrylate (B.1) with at least one monomer from the series comprising acrylonitrile, methacrylonitrile, methylmethacrylate, maleic anhydride and/or N-alkyl-substituted and N-aryl-substituted maleinimide (B.2).

The monomer B.1 content in the (co)polymer is preferably 50 to 99, particularly preferably 60 to 95 wt. % of the monomer B.2, preferably 1 to 50, particularly preferably 40 to 5 wt. %.

Particularly preferred copolymers B are those of styrene with acrylonitrile and optionally with methylmethacrylate, of α-methylstyrene with acrylonitrile and optionally with methylmethacrylate, or of styrene and α-methylstyrene with acrylonitrile and optionally with methylmethacrylate.

The (co)polymers according to component B are well known and may be prepared by free radical polymerisation, particularly by emulsion, suspension, solution or bulk polymerisation. The copolymers according to component B preferably have molecular weights $\overline{M}_w$ (weight-average, determined by light scattering or sedimentation) between 15,000 and 200,000.

Particularly preferred copolymers B according to the invention are also random copolymers of styrene and maleic anhydride which may be prepared preferably by a continuous bulk or solution polymerisation with incomplete conversions from the corresponding monomer.

The proportions of the two components of the random styrene-maleic anhydride copolymers suitable according to the invention may vary widely. The preferred maleic anhydride content is 5 to 25 wt. %.

Instead of styrene, the polymers may also contain styrenes substituted on the nucleus, such as p-methylstyrene, 2,4-dimethylstyrene and other substituted styrenes such as α-methylstyrene.

The molecular weights (number-average $\overline{M}_n$) of the random styrene-maleic anhydride copolymers suitable according to the invention according to component B may vary widely. The range from 60,000 to 200,000 is preferred. A limiting viscosity number from 0.3 to 0.9 (measured in dimethylformamide at 25° C.; see in this context Hoffmann, Krömer, Kuhn, Polymeranalytik I, Stuttgart 1977, page 316 et seq.) is preferred for these products.

Component C

The component C according to the invention represents graft polymers which may also be contained as a mixture in the moulding composition. These include graft copolymers with rubber-elastic properties which are obtainable substantially from at least 2 of the following monomers: chloroprene, butadiene-1,3, isoprene, styrene, acrylonitrile, ethylene, propylene, vinyl acetate and (meth)acrylates with 1 to 18 carbon atoms in the alcohol component; that is, polymers of the kind described e.g. in "Methoden der organischen Chemie" (Houben-Weyl), vol. 14/1, Georg Thieme Verlag, Stuttgart 1961, p. 393–406 and in C. B. Bucknall, "Toughened Plastics", Appl. Science Publishers, London 1977. Preferred polymers C are partially crosslinked and have gel contents of more than 20 wt. %, preferably more than 40 wt. %, particularly more than 60 wt. %.

Preferred graft polymers C include graft polymers of:

C.1 5 to 95, preferably 30 to 80 parts by wt. of a mixture of

C.1.1 50 to 99 parts by wt. of styrene, α-methylstyrene, styrenes substituted on the nucleus with halogen or methyl, methylmethacrylate or mixtures of said compounds, and C.1.2 1 to 50 parts by wt. of acrylonitrile, methacrylonitrile, methylmethacrylate, maleic anhydride, $C_1$-$C_4$-alkyl or phenyl-N-substituted maleinimides, or mixtures of said compounds on C.2 5 to 95, preferably 20 to 70 parts by wt. of polymer based on diene and/or alkylacrylate with a glass transition temperature below −10° C.

Preferred graft polymers C are, e.g. main chains C.2 grafted with styrene and/or acrylonitrile and/or (meth) acrylic acid alkyl esters, such as polybutadiene, butadiene/styrene copolymers and acrylate rubbers, i.e. copolymers of the kind described in DE-OS 1 694 173 (=U.S. Pat. No. 3,564,077); polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, as described e.g. in DE-OS 2 348 377 (=U.S. Pat. No. 3,919, 353).

Particularly preferred polymers C are, e.g., ABS-polymers as described e.g. in DE-OS 2 035 390 (=U.S. Pat. No. 3,644,574) or in DE-OS 2 248 242 (=GB-PS 1 409 275).

Particularly preferred graft polymers C are obtainable by graft reaction of

α10 to 70, preferably 15 to 50, particularly 20 to 40 wt. %, based on graft polymer C, of at least one (meth)

acrylate or 10 to 70, preferably 15 to 50, particularly 20 to 40 wt. % of a mixture of 10 to 50, preferably 20 to 35 wt. %, based on mixture, of acrylonitrile or (meth) acrylate and 50 to 90, preferably 65 to 80 wt. %, based on mixture, of styrene, as grafted side chain C.1 onto β30 to 90, preferably 50 to 85, particularly 60 to 80 wt. %, based on graft polymer C, of a butadiene polymer with at least 50 wt. %, based on β, of butadiene radicals as main chain C.2, wherein preferably the gel proportion of the main chain β is at least 70 wt. % (measured in toluene).

The degree of grafting G is preferably 0.15 to 0.55, and the average particle diameter $d_{50}$ of the graft polymer C.2 is 0.05 to 2 μm, preferably 0.1 to 0.6 μm. (Meth)acrylates α are esters of acrylic acid or methacrylic acid with monohydric alcohols with 1 to 18 carbon atoms. Methyl, ethyl and propyl esters of methacrylic acid, n-butylacrylate, t-butylacrylate and t-butylmethacrylate are particularly preferred.

The main chain β may, in addition to butadiene radicals, contain up to 50 wt. %, based on β, of radicals of other ethylenically unsaturated monomers such as styrene, acrylonitrile, esters of acrylic or methacrylic acid with 1 to 4 carbon atoms in the alcohol component (such as methylmethacrylate, ethylacrylate, methylmethacrylate, ethylmethacrylate), vinyl esters and/or vinyl ethers. The preferred main chain β is composed of pure polybutadiene.

The degree of grafting G designates the weight ratio of grafted-on graft monomers to the main chain and is dimensionless.

The average particle size $d_{50}$ is the diameter above and below which 50 wt. % of the particles lie in each case. It may be determined by ultracentrifuge measurement (W. Scholtan, H. Lange, Kolloid. Z. and Z. Polymere 250 (1972), 782–796).

Particularly preferred polymers C are, e.g., also graft polymers of

τ20 to 90 wt. %, based on component C, of acrylate rubber with a glass transition temperature of <−20° C. as main chain C.2 and δ10 to 80 wt. %, based on component C, of at least one polymerisable, ethylenically unsaturated monomer as graft monomer C. 1.

The acrylate rubbers τ of polymers C are preferably polymers of alkyl esters of acrylic acid, optionally with up to 40 wt. %, based on τ, of other polymerisable, ethylenically unsaturated monomers. The preferred polymerisable acrylates include $C_1$–$C_8$ alkyl esters, for example methyl, ethyl, butyl, n-octyl and 2-ethylhexyl esters; halogen alkyl esters, preferably halogen $C_1$–$C_8$ alkyl esters such as chloroethylacrylate, and mixtures of said monomers.

For the purpose of crosslinking, monomers with more than one polymerisable double bond may be copolymerised. Preferred examples of crosslinking monomers are esters of unsaturated monocarboxylic acids with 3 to 8 carbon atoms and unsaturated monohydric alcohols with 3 to 12 carbon atoms or saturated polyols with 2 to 4 OH groups and 2 to 20 carbon atoms, such as, e.g., ethylene glycol dimethacrylate, allyl methacrylate; polyunsaturated heterocyclic compounds such as, e.g., trivinyl and triallyl cyanurate; polyfunctional vinyl compounds such as di- and trivinylbenzenes, and triallyl phosphate and diallyl phthalate.

Preferred crosslinking monomers are allylmethacrylate, ethylene glycol dimethylacrylate, diallyl phthalate and heterocyclic compounds having at least 3 ethylenically unsaturated groups.

Particularly preferred crosslinking monomers are the cyclic monomers triallyl cyanurate, triallylisocyanurate, trivinyl cyanurate, triacryloyl hexahydro-s-triazine, triallyl benzenes.

The amount of crosslinking monomers is preferably 0.02 to 5, particularly 0.05 to 2 wt. %, based on the main chain τ.

In the case of cyclic crosslinking monomers with at least 3 ethylenically unsaturated groups, it is advantageous to limit the quantity to less than 1 wt. % of the main chain τ.

Preferred "other" polymerisable, ethylenically unsaturated monomers which, in addition to the acrylates, may serve optionally for the preparation of the main chain τ are, e.g., acrylonitrile, styrene, α-methylstyrene, acrylamides, vinyl $C_1$–$C_6$ alkyl ethers, methylmethacrylate, butadiene. Preferred acrylate rubbers as main chain τ are emulsion polymers which have a content of at least 60 wt. %.

Further suitable main chains according to C.2 are silicone rubbers with active grafting sites as described in DE-OS 3 704 657, DE-OS 3 704 655, DE-OS 3 631 540 and DE-OS 3 631 539.

The gel content of the main chain C.2 is determined at 25° C. in dimethylformamide (M. Hoffmann, H. Krömer, R. Kuhn, Polymeranalytik I und II, Georg Thieme-Verlag, Stuttgart 1977).

The graft polymers C may be prepared by known processes such as bulk, suspension, emulsion or bulk-suspension processes. Suitable catalysts are, for example, ascorbic acid and hydroperoxides such as cumene hydroperoxide.

Component D

The phosphorus compounds contained in the moulding compositions according to the invention are metal compounds of monoesters of phosphoric acid corresponding to formula (Ia) and (Ib).

(Ia)

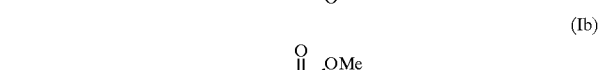

(Ib)

or metal compounds of diesters of phosphoric acid according to formula (II)

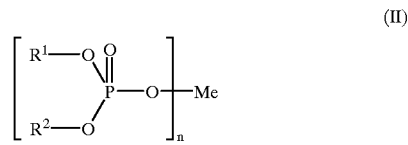

(II)

wherein $R^1$ and $R^2$, Me and n have the meaning described above.

$R^1$ and $R^2$, independently of one another, stand preferably for optionally halogenated (preferably by chlorine and/or bromine) $C_1$–$C_{15}$-alkyl, particularly $C_1$–$C_{10}$-alkyl, cyclopentyl, cyclohexyl, phenyl, naphthyl, phenyl-$C_1$–$C_4$-alkyl (such as benzyl) substituted in each case optionally by halogen (preferably chlorine and/or bromine) and/or $C_1$–$C_6$-alkyl, particularly $C_1$–$C_4$-alkyl, particularly methyl, ethyl, n-, isopropyl.

$R^1$ and $R^2$, independently of one another, stand in particular preference for cresyl, phenyl, xylenyl, propylphenyl or butylphenyl and the corresponding brominated and chlorinated derivatives thereof.

In the case of formula (II), $R^1$ and $R^2$ may also form an alkylene radical, preferably with up to 6, particularly 2 or 3 carbon atoms, or an arylene radical, preferably phenylene.

Suitable metals are the 1st to 3rd main group and the subsidiary group (VIII), IB and IIB of the periodic system (after Mendeleev), metals of the 2nd and 3rd main group and of subsidiary group II being preferred.

The compounds of the metals Mg, Ca, Ba, B, Al and Zn are particularly preferred.

Processes known in the literature are suitable for the preparation of the metal compounds of phosphates according to the invention, such as, for example, the transesterification process starting from triesters of phosphoric acid or the acid halide process starting from phosphoryl chloride (EP-A-0 801 116; J. Org. Chem. 1978, vol. 43, no. 1, p. 24–31).

Preferably, the inorganic reaction components are used in a very finely divided form for the preparation of the phosphates according to the invention. The average particle diameters are $\leq 1\ \mu m$, preferably $\leq 200$ nm.

The average particle diameters of the phosphates according to the invention are $<10\ \mu m$, preferably $<1\ \mu m$, particularly preferably $<300$ nm.

The thermoplastic moulding compositions may also contain inorganic reinforcing materials such as glass fibres, optionally chopped or ground, glass beads, glass spheres, reinforcing agents in leaf form, such as kaolin, talc, mica, carbon fibres and a mixture thereof. Preferably chopped or ground glass fibres, preferably with a length from 1 to 10 mm and a diameter from $<20\ \mu m$ in a quantity of 1 to 40 parts by wt. are used as reinforcing material; the glass fibres are preferably surface-treated.

The moulding compositions according to the invention may generally contain 0.01 to 20 wt. %, based on the total moulding composition, of flame retardant. Examples of flame retardants used are organic halogen compounds such as decabromobisphenylether, tetrabromobisphenol, inorganic halogen compounds such as ammonium bromide, nitrogen compounds, such as melamine, melamine formaldehyde resins, inorganic hydroxide compounds such as Mg and Al hydroxide, inorganic compounds such as aluminium oxides, titanium dioxides, antimony oxides, barium metaborate, hydroxoantimonate, zirconium oxide, zirconium hydroxide, molybdenum oxide, ammonium molybdate, tin borate, ammonium borate, barium metaborate and tin oxide and siloxane compounds.

Moreover, phosphorus compounds as described in EP-A 363 608, EP-A 345 522 or EP-A 640 655 may be used as flame retardant compounds.

Such phosphorus compounds are, for example, phosphorus compounds corresponding to formula (V)

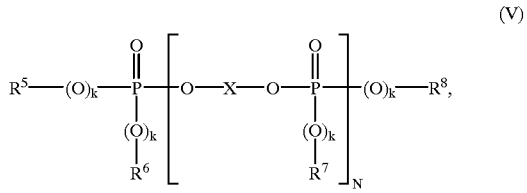

(V)

wherein $R^5$, $R^6$, and $R^8$, independently of one another, mean $C_1$–$C_8$-alkyl in each case optionally halogenated, $C_5$–$C_6$-cycloalkyl, $C_6$–$C_{20}$-aryl or $C_7$–$C_{12}$-aralkyl, in each case optionally substituted by alkyl, preferably $C_1$–$C_4$-alkyl, and/or halogen, preferably chlorine, bromine.

Preferably, $R^5$, $R^6$, $R^7$ and $R^8$, independently of one another, stand for $C_1$–$C_4$-alkyl, phenyl, naphthyl or phenyl-$C_1$–$C_4$-alkyl. The aromatic groups $R^5$, $R^6$, $R^7$ and $R^8$ may in turn be substituted with halogen and/or alkyl groups, preferably chlorine, bromine and/or $C_1$–$C_4$-alkyl. Particularly preferred aryl radicals are cresyl, phenyl, xylenyl, propylphenyl or butylphenyl and the corresponding brominated and chlorinated derivatives thereof.

X in formula (V) means a mono- or polynuclear aromatic radical with 6 to 30 carbon atoms. This is derived from diphenols according to formula (II) such as e.g. diphenylphenol, bisphenol A, resorcinol or hydroquinone or the chlorinated or brominated derivatives thereof.

k in formula (V), independently of one another, may be 0 or 1, preferably n is equal to 1.

N stands for values from 0 to 30, preferably for 0 or an average value from 0.3 to 20, particularly preferably 0.5 to 10, particularly 0.5 to 6, in the case of mixtures.

Mixtures of phosphorus compounds corresponding to formula (V) contain preferably 10 to 90 wt. %, preferably 12 to 40 wt. % of at least one monophosphorus compound corresponding to formula (V) and of at least one oligomeric phosphorus compound or a mixture of oligomeric phosphorus compounds in quantities from 10 to 90 wt. %, preferably 60 to 88 wt. %, based on the total quantity of phosphorus compounds used.

Monophosphorus compounds corresponding to formula (V) are, in particular, tributyl phosphate, tris-(2-chloroethyl) phosphate, tris-(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl)phosphate, halogen-substituted arylphosphates, methylphosphonic acid dimethyl ester, methylphosphonic acid diphenyl ester, phenylphosphonic acid diethyl ester, triphenylphosphine oxide or tricresylphosphine oxide.

The mixtures of monomeric and oligomeric phosphorus compounds corresponding to formula (V) have average N values from 0.3 to 20, preferably 0.5 to 10, particularly 0.5 to 6.

The phosphorus compounds according to formula (V) are well known (cf e.g. EP-A 363 608, EP-A 640 655, EP-A 542 522) or can be prepared in a similar manner by well known methods (e.g. Ullmanns Encyklopädie der technischen Chemie, vol. 18, p. 301 et seq., 1979; Houben-Weyl, Methoden der organischen Chemie, vol, 12/1, p. 43; Beilstein vol. 6, p. 177).

Moreover, the thermoplastic moulding compositions according to the invention may contain very finely divided inorganic compounds which have a favourable effect on the flame retardant properties of the moulding compositions according to the invention. These inorganic compounds include compounds of one or more metals of the 1st to the 5th main group and of the 1st to the 8th subsidiary group of the periodic system, preferably of the 2nd to the 5th main group and of the 4th to the 8th subsidiary group, particularly preferably of the 3rd to the 5th main group and of the 4th to the 8th subsidiary group with the elements oxygen, sulfur, boron, phosphorus, carbon, nitrogen, hydrogen and/or silicon.

Preferred compounds are, for example, oxides, hydroxides, water-containing oxides, sulfates, sulfites, sulfides, carbonates, carbides, nitrates, nitrites, nitrides, borates, silicates, phosphates, hydrides, phosphites or phosphonates.

Preferred very finely divided inorganic compounds are, for example, TiN, $TiO_2$, $SnO_2$, WC, ZnO, $Al_2O_3$, AlO(OH), $ZrO_2$, $Sb_2O_3$, $SiO_2$, iron oxides, $NaSO_4$, $BaSO_4$, vanadian oxides, zinc borate, silicates such as Al silicates, Mg silicates, one- two- or three-dimensional silicates, mixtures and doped compounds may also be used. Moreover, these nanoscale particles may be surface-modified with organic molecules in order to obtain better compatibility with the polymers. Hydrophobic or hydrophilic surfaces may be obtained in this way.

The average particle diameters are less than 200 nm, preferably less than 150 nm, particularly 1 to 100 nm.

Particle size and particle diameter always means the average particle diameter $d_{50}$, determined by ultracentrifuge measurements according to W. Scholtan et al., Kolloid-Z. und Z. Polymere 250 (1972), p.782 to 796.

The inorganic compounds may be present as powders, pastes, sols, dispersions or suspensions. Powders may also be obtained by precipitation from dispersions, sols or suspensions.

The powders may be incorporated in the thermoplastic plastics by conventional methods, for example by direct kneading or extrusion of the constituents of the moulding composition and the very finely divided inorganic powders. Preferred methods are the preparation of a masterbatch, e.g. in flame retardant additives, other additives, monomers, solvents, in component A, or the co-precipitation of dispersions of component B or C with dispersions, suspensions, pastes or sols of the very finely divided inorganic materials.

The moulding compositions according to the invention may also contain conventional additives such as lubricants and mould release agents, nucleating agents, antistatic agents, stabilisers, fillers and reinforcing agents, and dyes and pigments.

Moreover, fluorinated polyolefins may be added. The fluorinated polyolefins are high molecular weight and have glass transition temperatures of more than −30° C., usually more than 100° C., fluorine contents preferably from 65 to 76, particularly from 70 to 76 wt. %, average particle diameters $d_{50}$ from 0.05 to 1,000, preferably 0.08 to 20 µm. Generally speaking, the fluorinated polyolefins E have a density of 1.2 to 2.3 g/cm³.

Preferred fluorinated polyolefins are polytetrafluoroethylene, polyvinylidene fluoride, tetrafluoroethylene/hexafluoropropylene and ethylene/tetrafluoroethylene copolymers. The fluorinated polyolefins are well known (cf "Vinyl and Related Polymers" by Schildknecht, John Wiley & Sons, Inc., New York, 1962, page 484 to 494; "Fluorpolymers" by Wall, Wiley-Interscience, John Wiley & Sons, Inc, New York, vol. 13, 1970, page 623 to 654; "Modern Plastics Encyclopedia", 1970 to 1971, vol. 47, No. 10A, October 1970, McGraw-Hill Inc., New York, page 134 and 774; "Modern Plastics Encyclopedia", 1975 to 1976, October 1975, vol. 52, no. 10A, McGraw-Hill Inc., New York, page 27, 28 and 472 and U.S. Pat. No. 3,671,487, 3,723, 373 and 3 838 092).

They may be prepared by well known processes, such as, for example, by polymerisation of tetrafluoroethylene in an aqueous medium with a catalyst forming free radicals, for example, sodium, potassium or ammonium peroxydisulphate at pressures from 7 to 71 kg/cm² and at temperatures from 0 to 200° C., preferably at temperatures from 20 to 100° C. (for further details, see e.g. U.S. Pat. No. 2,393,967). Depending on the form of use, the density of these materials may be between 1.2 and 2.3 g/cm³, and the average particle size between 0.05 and 1,000 nm.

Fluorinated polyolefins preferred according to the invention are tetrafluoroethylene polymers and have average particle diameters from 0.05 to 20 µm, preferably 0.08 to 10 µm, and a density from 1.2 to 1.9 g/cm³. They are used preferably in the form of a coagulated mixture of emulsions of tetrafluoroethylene polymers with emulsions of graft polymers C.

Suitable fluorinated polyolefins which may be used in powder form are tetrafluoroethylene polymers with average particle diameters from 100 to 1,000 µm and densities from 2.0 g/cm³ to 2.3 g/cm³.

In order to prepare a coagulated mixture of C and the fluorinated polyolefin, an aqueous emulsion (latex) of a graft polymer C with average latex particle diameters from 0.05 to 2 µm, particularly 0.1 to 0.6 µm, is first mixed with a finely divided emulsion of a fluorinated polyolefin in water with average particle diameters from 0.05 to 20 µm, particularly from 0.08 to 10 µm; suitable tetrafluoroethylene polymer emulsions usually have solids contents from 30 to 70 wt. %, particularly from 50 to 60 wt. %.

The aqueous emulsion of graft polymer C has solids contents from 25 to 60 wt. %, preferably from 30 to 45 wt. %, particularly from 30 to 35 wt. %.

The quantity indication in the description of component C does not include the proportion of graft polymer in the coagulated mixture of graft polymer and fluorinated polyolefins.

The weight ratio of graft polymer C to the fluorinated polyolefin in the emulsion mixture is 95:5 to 60:40. The emulsion mixture is coagulated in a known way, for example, by spray drying, freeze drying or coagulation with the addition of inorganic or organic salts, acids, bases or organic water-miscible solvents such as alcohols, ketones, preferably at temperatures from 20 to 150° C., particularly from 50 to 100° C. If necessary, drying may be carried out at 50 to 200° C., preferably 70 to 100° C.

Suitable tetrafluoroethylene polymer emulsions are commercial products and are supplied, for example, by the company DuPont as Teflon® 30 N.

The moulding compositions according to the invention are prepared by mixing the constituents in question in the known way and melt compounding and melt extrusion at temperatures from 200° C. to 300° C. in conventional equipment such as internal mixers, extruders and twin shaft screws, the fluorinated polyolefin being used preferably in the form of the above-mentioned coagulated mixture.

The mixing of the individual constituents may take place in a known way both successively and simultaneously, both at about 20° C. (room temperature) and at elevated temperature.

The moulding compositions of the present invention may be used for the preparation of moulded articles by injection moulding. Examples of moulded articles that may be produced are: housing parts of every kind, e.g. for household appliances such as juice squeezers, coffee machines, mixers, for office machines such as monitors, computers, printers, copiers or cover plates for the building sector and parts for the automotive sector. They are also used in electrical engineering because they have very good electrical properties.

Another form of processing is the production of moulded articles by thermoforming from previously produced sheets or films.

The present invention also provides, therefore, the use of the moulding compositions according to the invention for the production of moulded articles of all kinds, preferably of the above-mentioned kind, and also moulded articles of the moulding compositions according to the invention.

EXAMPLES

Component A

Linear polycarbonate based on bisphenol A with a relative solution viscosity of 1.252, measured in $CH_2Cl_2$ as solvent at 25° C. and in a concentration of 0.5 g/100 ml.

Component B

Styrene/acrylonitrile copolymer with a styrene/acrylonitrile ratio of 72:28 and a limiting viscosity number of 0.55 dl/g (measurement in dimethylformamide at 20 ° C.).

Component C

Graft polymer of 45 parts by wt. of a copolymer of styrene and acrylonitrile in a ratio of 72:28 to 55 parts by wt. of particulate crosslinked polybutadiene rubber (average particle diameter $d_{50}=0.4$ μm) prepared by emulsion polymerisation.

Component D

Magnesium diphenylphosphate

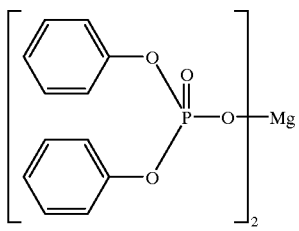

PTFE

Tetrafluoroethylene polymer as a coagulated mixture of a SAN graft polymer emulsion according to the above-mentioned component in water and a tetrafluoroethylene polymer emulsion in water. The weight ratio of graft polymer to the tetrafluoroethylene polymer in the mixture is 90 wt. % to 10 wt. %. The tetrafluoroethylene polymer emulsion has a solids content of 60 wt. %, the average particle diameter is between 0.05 and 0.5 μm. The SAN graft polymer emulsion has a solids content of 34 wt. % and an average latex particle diameter $d_{50}=0.28$ μm.

The emulsion of the tetrafluoroethylene polymer (Teflon 30 N from DuPont) is mixed with the emulsion of the graft polymer and stabilised with 1.8 wt. %, based on polymer solid, of phenolic antioxidants. At 85 to 95° C., the mixture is coagulated with an aqueous solution of $MgSO_4$ (bitter salt) and acetic acid at pH 4 to 5, filtered and washed until practically free from electrolyte, the majority of the water is then removed by centrifuging, and the material is then dried at 100° C. to a powder. This powder may then be compounded with the other components in the equipment described.

Preparation and Testing of the Moulding Compositions According to the Invention

The components are mixed with the conventional processing auxiliaries in a 3 l internal mixer. The moulded articles are produced on an injection moulding machine of the Arburg 270E type at 260° C.

The notched impact strength is determined according to the ISO 180 1A method on bars with the dimensions 80×10×4 $mm^3$. at room temperature.

The Vicat B softening point is determined according to DIN 53 460 on bars with the dimensions 80×10×4 $mm^3$.

The stress cracking behavior is examined on bars with the dimensions 80×10×4 mm, mass temperature 260° C. The test medium used is a mixture of 60 vol. % of toluene and 40 vol. % of isopropanol. The test specimens are pre-extended by means of a circular arc template (pre-extension 2.4%) and stored at room temperature in the test medium.

The stress cracking behavior is assessed by way of the crack formation and fracture as a function of the exposure time in the test medium.

TABLE 1

Composition and results (details in parts by wt.)

| Component | Example 1 | Example 2 |
|---|---|---|
| A | 67.0 | 67.0 |
| B | 10.0 | 10.0 |
| C | 7.5 | 7.5 |
| PTFE coagulated | 3.5 | 3.5 |
| D | 10.0 | 12.0 |
| $a_k$ Izod 260° C./RT (kJ/$m^2$) | 68z | 73z |
| Vicat B 120 (° C.) | 128 | 133 |
| ESC screening: 10 min/2.4% | no findings | |

As a result of using the phosphorus compounds according to the invention in polycarbonate-ABS mixtures, moulding compositions with good heat resistance and surprisingly good mechanical properties (notched impact strength, stress cracking behavior) are obtained.

What is claimed is:

1. Thermoplastic moulding compositions containing

A 5 to 95 parts by wt. of polycarbonate and/or polyester carbonate,

B 0 to 50 parts by wt. of a vinyl (co)polymer of one or at least two ethylenically unsaturated monomers, C 0.5 to 60 parts by wt. of graft polymer with a glass transition temperature of <10° C., obtainable by graft polymerisation of at least 2 of the monomers selected from chloroprene, butadiene, isoprene, styrene, acrylonitrile, ethylene, propylene, vinyl acetate and (meth)acrylate with 1 to 18 carbon atoms in the alcohol component, and D 0.5 to 20 parts by wt. of phosphorus compound corresponding to formula (Ia) and/or (Ib)

(Ia)

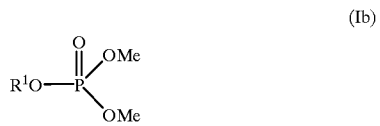

(Ib)

or to the formula (II)

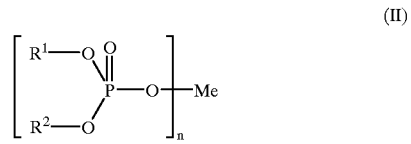

(II)

wherein $R^1$ and $R^2$ independently of one another, mean optionally halogenated $C_1$–$C_{24}$-alkyl, $C_5$–$C_6$-cycloalkyl, $C_6$–$C_{20}$-aryl or $C_7$–$C_{12}$-aralkyl in each case optionally substituted by halogen and/or $C_1$–$C_{10}$-alkyl, or in the case of formula (II) $R^1$ and $R^2$ may also form an alkylene or arylene radical, Me stands for a metal selected from the 1st to 3rd main group or the subsidiary group VIII, IB or 2B of the periodic system, and n is determined by the valency of the metal ion.

2. Moulding compositions according to claim 1 containing 10 to 90 parts by wt. of A, 0 to 30 parts by wt. of B, 1 to 40 parts by wt. of C and 1 to 18 parts by wt. of D.

3. Moulding compositions according to claim 1, containing as component B (co)polymers of one or at least 2 monomers selected from the group of compounds comprising styrene, α-methylstyrene, styrenes substituted on the nucleus, acrylonitrile, methacrylonitrile, methylmethacrylate, maleic anhydride, N-substituted maleinimides and (meth)acrylates with 1 to 18 C atoms in the alcohol component.

4. Moulding compositions according to claim 1 containing as component C a graft polymer of C.1 5 to 95, preferably 30 to 80 parts by wt. of a mixture of
  C.1.1 50 to 99 parts by wt. of styrene, α-methylstyrene, styrenes substituted on the nucleus with halogen or methyl, methylmethacrylate or mixtures of said compounds, and
  C.1.2 1 to 50 parts by wt. of acrylonitrile, methacrylonitrile, methylmethacrylate, maleic anhydride, $C_1$–$C_4$-alkyl or phenyl-N-substituted maleinimides, or mixtures of said compounds on C.2 5 to 95 parts by wt. of polymer based on diene and/or alkylacrylate with a glass transition temperature below −10° C.

5. Moulding compositions according to claim 4, wherein C.2 is polybutadiene, polyisobutenes, polyisoprenes, butadiene/styrene or butadiene/acrylonitrile copolymer.

6. Moulding compositions according to claim 1, wherein in the formulae (Ia), (Ib) and (II) Me stands for a metal of the 2nd and 3rd main group and of subsidiary group II.

7. Moulding compositions according to claim 6, wherein in the formulae (Ia), (Ib) and (II) Me stands for Mg, Ca, Ba, B, Al or Zn.

8. Moulding compositions according to claim 1, wherein $R^1$ and $R^2$ stand for optionally halogenated $C_1$–$C_{10}$-alkyl, cyclopentyl, cyclohexyl, phenyl, naphthyl or phenyl-$C_1$–$C_4$-alkyl in each case optionally substituted by halogen and/or $C_1$–$C_4$-alkyl.

9. Moulding compositions according to claim 1, wherein the compounds according to component D have average particle diameters of less than 10 μm.

10. Moulding compositions according to claim 9, wherein the average particle diameter of component D is <1 μm.

11. Moulding compositions according to claim 10, wherein the average particle diameter of component D is <300 nm.

12. Moulding compositions according to claim 1, containing additives selected from at least one of the group of inorganic reinforcing materials, flame retardants, fluorinated polyolefins, very finely divided inorganic compounds, lubricants, mould release agents, nucleating agents, antistatic agents, stabilisers, dyes and pigments.

13. Moulding compositions according to claim 12, containing as flame retardant inorganic, organic halogen compounds, inorganic hydroxides, oxides, antimonates, borates, molybdates, phosphorus compounds different from compounds corresponding to formulae (Ia), (Ib) and (II) and/or siloxane compounds.

14. Moulding compositions according to claim 12 containing, as flame retardant, phosphorus compounds corresponding to formula (V)

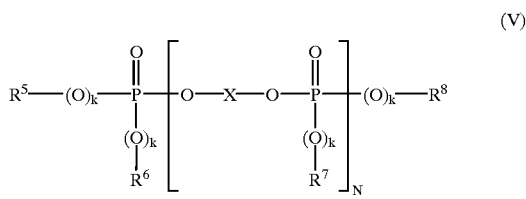

wherein $R^5$, $R^6$, $R^7$ and $R^8$, independently of one another, mean $C_1$–$C_8$-alkyl in each case optionally halogenated, $C_5$–$C_6$-cycloalkyl, $C_6$–$C_{20}$-aryl or $C_7$–$C_{12}$-aralkyl, in each case optionally substituted by alkyl and/or halogen, X stands for a mono- or polynuclear aromatic radical with 6 to 30 carbon atoms, k stands for 0 or 1 and N stands for values from 0 to 30.

15. Moulding compositions according to claim 14, wherein X in formula (V) is derived from diphenols corresponding to formula (II):

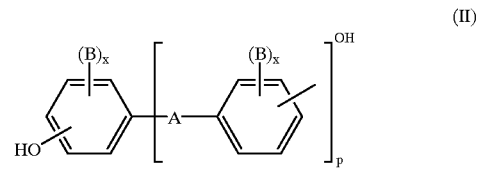

wherein

A means a simple compound, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, on which further aromatic rings optionally containing heteroatoms may be condensed, or a radical corresponding to formula (III) or (IV)

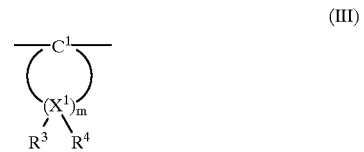

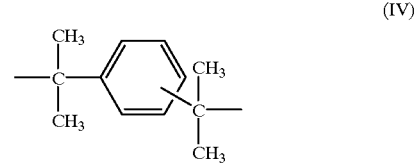

B in each case means $C_1$–$C_{12}$-alkyl or halogen, x in each case, independently of one another, is 0, 1 or 2, p is 1 or 0, and $R^3$ and $R^4$ which may be chosen individually for each $X^1$, independently of one another, mean hydrogen or $C_1$–$C_6$-alkyl $X^1$ means carbon and m is an integer from 4 to 7, provided that on at least one atom $X^1$, $R^3$ and $R^4$ are simultaneously alkyl.

16. Moulding compositions according to claim 1, containing very finely divided inorganic compounds of one or more metals of the 1st to the 5th main group and of the 1st to the 8th subsidiary group of the periodic system with the elements oxygen, sulfur, boron, phosphorus, carbon, nitrogen, hydrogen and/or silicon.

* * * * *